United States Patent

Adams

[15] 3,675,141

[45] July 4, 1972

[54] MODULAR SOLID-STATE POWER AMPLIFIER

[72] Inventor: Robert H. Adams, Sun Valley, Calif.

[73] Assignee: Lockheed Aircraft Corporation, Burbank, Calif.

[22] Filed: March 8, 1971

[21] Appl. No.: 121,711

Related U.S. Application Data

[63] Continuation-in-part of Ser. No. 835,344, June 23, 1969, Pat. No. 3,569,847.

[52] U.S. Cl. ....................................330/13, 330/15, 330/20, 330/30 R

[51] Int. Cl. ........................................................H03f 3/18

[58] Field of Search ...............................330/13, 20, 15, 30 R

*Primary Examiner*—Nathan Kaufman

*Attorney*—George C. Sullivan

[57] ABSTRACT

A modular solid-state amplifier capable of delivering several kilowatts of audio-frequency power over a frequency range of 0 to approximately 7,500 hertz and which has an output impedance selectively variable from substantially zero to approximately 100,000 ohms. The amplifier modules may readily be combined to obtain either voltage or current gain, or both, by appropriate series and parallel arrangements, or combinations thereof.

10 Claims, 4 Drawing Figures

INVENTOR.
ROBERT H. ADAMS
BY George C. Sullivan
Ralph M. Flygare
Agents

INVENTOR.
ROBERT H. ADAMS
BY George P. Sullivan
Ralph M. Flygare
Agents

INVENTOR.
ROBERT H. ADAMS
George C. Sullivan
Ralph M. Flygare
Agents

MODULAR SOLID-STATE POWER AMPLIFIER

CROSS REFERENCE TO RELATED APPLICATION

This application is a continuation-in-part of copending application Ser. No. 835,344 filed June 23, 1969, now U.S. Pat. No. 3,569,847, both of which are of common assignee.

BACKGROUND OF THE INVENTION

A common application for high-power audio frequency amplifiers is in shock and vibration testing systems of the type utilizing electrodynamic shaker motors. Both vacuum tube and transistor amplifiers have been employed heretofore as a means for driving such shakers. However, such prior systems have been characterized by low-frequency distortion, insufficient damping of the shaker motor, and inadequate control of the damping factor. Furthermore, the amplifiers of the prior art generally have to be individually modified so as to be compatible with each specific shaker motor, thus seriously limiting their versatility. Also, amplifiers required to handle several kilowatts of output power are highly susceptible to high-frequency signal stability problems. Transistor amplifiers have, heretofore, generally employed complex protective devices to overcome the problem of thermal instability.

SUMMARY OF THE INVENTION

The present invention relates to a transistorized direct-coupled amplifier of a modular construction wherein various circuit modules may easily be arranged in cascade or other combinations to provide the desired performance characteristics. The very-high stability of the amplifier modules permits multiple arrangements to be made without the hazards usually encountered in power amplifiers having such high output ratings. Each amplifier module comprises a complementary-cascade amplifier connected to a negative power supply and a series of cascaded emitter-follower amplifiers connected to a positive power supply. The amplifier modules can be paralleled directly with like amplifiers to increase the output current rating. The modules also may be connected in series to increase the output voltage rating of the overall system. Both series and/or parallel combinations of the amplifier module assemblies may be driven from one preamplifier, which can provide the necessary gain for the overall feedback loop. Selective variations in the output specifications of the amplifier system permits it to be readily matched to virtually any shaker motor. Furthermore, the amplifier system, by reason of its novel design, has an unusually wide frequency range (typically 0 to 7,500 hertz at the half-power point). Selective control of the damping factor permits the shaker motor to be driven by either a pulse or a complex waveform. The amplifier system has unusually good thermal and high-frequency stability. Furthermore, the novel circuit of the system incorporates safety features which protect the power transistors from overloads or surges, as well as from starting transients. It is, therefore, an object of the invention to provide a novel and improved very-high-power, solid-state power-amplifier module suitable for incorporation into an amplifier system having selectively variable output power capacity and other operating parameters.

Another object of the invention is to provide a novel and improved power amplifier system of modular construction which may readily be expanded or arranged to conform to a wide range of desired parameters.

It is yet another object of the invention to provide a novel and improved solid-state amplifier system which is particularly applicable to the driving of shaker motors and the like.

These and other objects and features of the invention will be more readily understood upon consideration of the following specification and drawings.

DESCRIPTION OF THE PREFERRED EMBODIMENT

Figure 3:
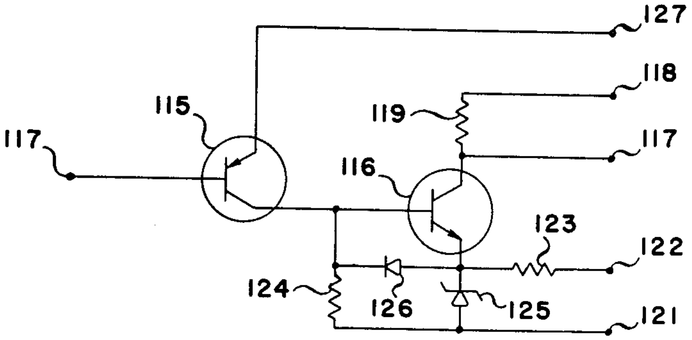
FIG. 3 is a schematic circuit diagram of an input-amplifier suitable for use with the power-amplifier module of the invention.

There follows a description of a first exemplary embodiment of the invention comprising a 5-kilowatt amplifier system having a frequency response from 0 to 7,500 hertz and an output impedance of 500 ohms. A typical application of such an embodiment is for driving a shaker motor designed to operate at 20 volts peak, 500 amperes peak, over the above-noted frequency range. The exemplary system is basically a bridge-type amplifier comprising four power amplifier modules 1–4 constructed in accordance with the invention. These four modules are wired into two sets of parallel-connected amplifiers (1–2 and 3–4, respectively), which are in turn driven from a preamplifier 5 via two input amplifiers 6–7 acting as buffer stages between the preamplifier 5 and the power amplifier modules (1–4). An overall feedback loop is provided for the control of the output impedance and the establishment of linear transfer functions over the desired frequency range. Voltage feedback is provide by loops 8 and 8', and current feedback is obtained via loops 8 and 8', and 9 and 9'. The impedance of the output at terminals 11 and 12 may be set by using selected amounts of either one or both types of feedback. Current sensing resistors 13 and 14 are contained within loops 8 and 8'.

A local feedback loop 10 and 10' between each input amplifier (6–7) and its set of power amplifier modules (1–4) is provided to linearize the power amplifier-input amplifier sets and to make the response essentially independent of frequency. This feature will be discussed in greater detail in connection with FIG. 4. A common ground 15 exists for the power amplifier modules 1–4. The embodiment of FIG. 1 may be expanded in 250 ampere increments by the parallel addition of power modules (e.g., amplifiers 1–2) in each of the two sets comprising the bridge amplifier.

The input signal is applied to terminal 16 of the preamplifier 5. The input signal is typically 1 volt from a source impedance of 500 ohms. The signals appearing on lines 17 and 18, from preamplifier 5, are 180° out of phase as is required for driving the bridge-amplifier. The push-pull signals on lines 17 and 18 are supplied to respective ones of input amplifiers 6 and 7. Each power amplifier module comprises a class B amplifier having an emitter-follower amplifier for amplifying the positive half of the signal cycle and a complementary-cascade amplifier for amplifying the negative half of the input signal cycle. Modules 3 and 4 function in the same manner as modules 1 and 2 except that they are driven from the inverted phase output from preamplifier 5 (via amplifier 7). The load is connected between the two sets of power amplifier modules comprising the bridge.

Figure 1:
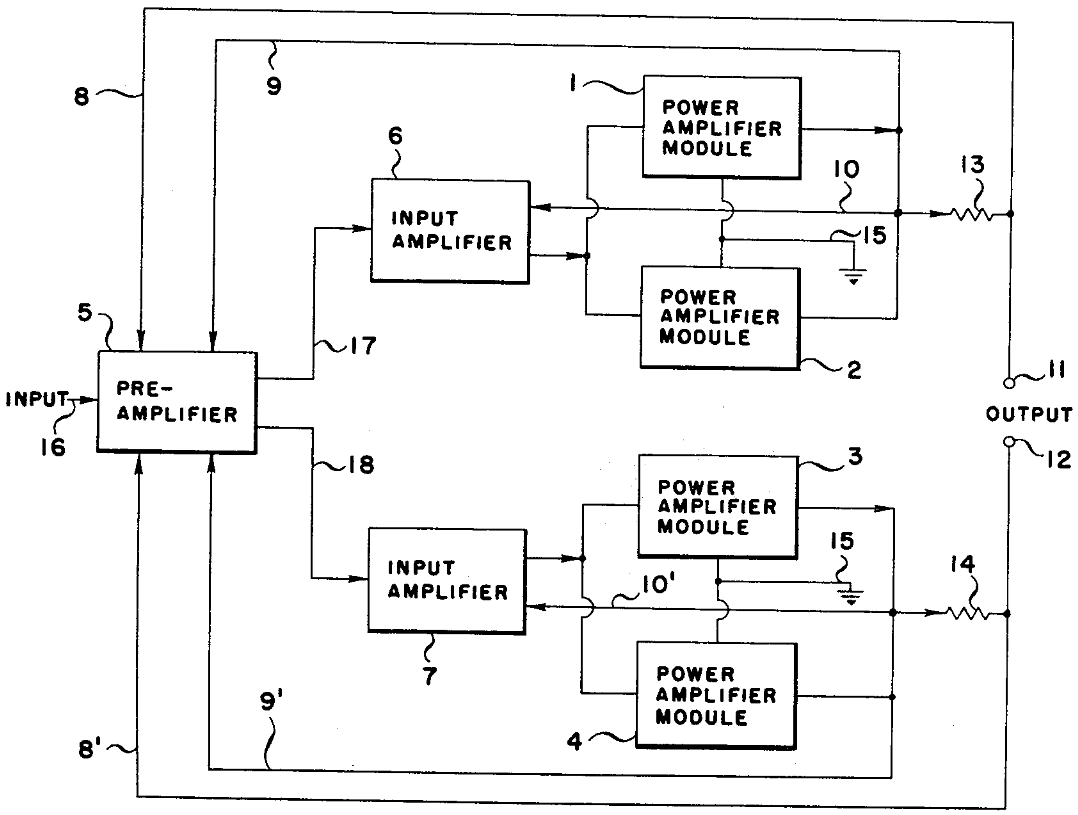
FIG. 1 is a block diagram illustrating an amplifier system employing the power amplifier modules of the invention.
Figure 2:
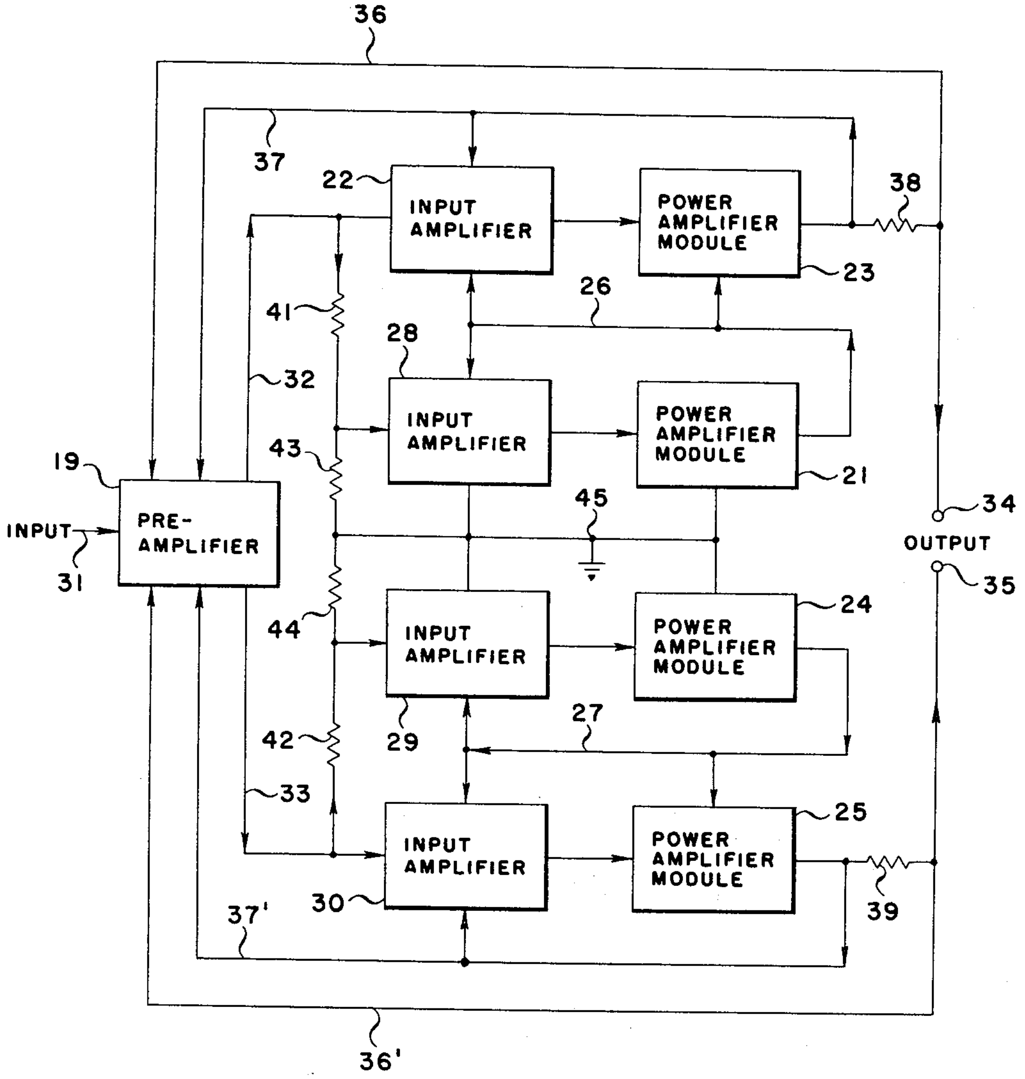
FIG. 2 is a block diagram of a second amplifier system according to the invention, using series-connected power-amplifier modules in lieu of the parallel-connected modules employed in the embodiment of FIG. 1.

There is shown in FIG. 2 another example of an amplifier system incorporating the power-amplifier modules of the invention, and which will provide an output of 40 volts at 250 amperes. The building blocks or modules are substantially identical to those shown in FIG. 1, the difference being a series arrangement, rather than a parallel arrangement of the power amplifier stages. The high voltage system of FIG. 2 also employs a bridge-type amplifier configuration. The two sets of power amplifier modules are wired in series rather than in parallel as in the previously described example. For example, power amplifier module 21 has its output connected in series with the return of the power supply for input amplifier 22 and the power amplifier module 23. Similarly, power amplifier module 24 has its output wired in series with the return of the power supply for input amplifier 30 and power amplifier module 25. As can be seen, each power amplifier module is driven by an input amplifier which, by action of the local loop 26 or 27, permits the two sets of series-connected power amplifier modules to combine their outputs, thus producing a total output voltage of twice that of each one. A common preamplifier 19 drives the input amplifiers 22, and 28–30. The input signal source is connected to terminal 31. The signals appearing on lines 32 and 33 from preamplifier 28 are 180 degrees out of phase. The bridge-amplifier output appears across terminals 34–35.

An overall current feedback loop 36, 36' and 37, 37' is connected around the system. Voltage-only feedback is provided by using only loops 36 and 36'. Current sensing resistors 38 and 39 are located in feedback loops 36 and 36'.

Inasmuch as the output from power amplifier module 21 is supplied via loop 26 to input amplifier 22, the direct output of preamplifier 19, on line 32, must be reduced by a proper amount before being applied to the input of input amplifier 28. This is accomplished by a voltage divider comprising resistors 41 and 43.

The voltage divider comprising resistors 42 and 44 serves a similar function for input amplifier 29. Resistors 43 and 44 are referenced to ground 45.

As in the embodiment of FIG. 1, the power amplifier modules can be added in parallel for increased current output. Also, assuming that the preamplifier 28 is capable of providing the total required input signal level, additional output potential at terminals 34 and 35 may be obtained by connecting more power amplifier-input amplifier combinations in series with the existing series string. Any suitable and well-known preamplifier, such as that shown in FIG. 3 of the aforementioned U.S. Pat. No. 3,569,847, may be used for preamplifier 19.

There is shown in FIG. 3 a schematic circuit diagram of a suitable input amplifier for use with the invention. This corresponds to blocks 6, 7, 22 and 28–30 of FIGS. 1 and 2. The input amplifier is a high-gain voltage amplifier capable of driving two or more power amplifier modules. Its primary purpose is to isolate the preamplifier (e.g., preamplifier 5) from the power amplifier modules (e.g., modules 1 and 2), and to provide sufficient local feedback so that the voltage gain of the input amplifier-power module combination is essentially independent of frequency. The isolation and wide-band response characteristics of the input amplifier are important to the series configuration of the total amplifier system.

As shown in FIG. 3, the circuit comprises two gain stages in cascade. The first stage transistor 115 is a PNP silicon transistor having its emitter directly coupled to the base of the NPN silicon transistor 116. The input signal from the preamplifier appears at terminal 117 and is applied to the base of transistor 115. The output is taken from the collector of transistor 116 via output terminal 117. A positive supply of operating potential, nominally 30 volts, is applied to the collector of transistor 116 via terminal 118 and resistor 119. A negative supply, nominally minus 30 volts, is applied to terminal 121. Terminal 122 is common to the power supplies and to the output, and connects via resistor 123 to the emitter of transistor 116. Resistor 123 maintains a minimum current flow through zener diode 125. Resistor 124, connected between the base and the 10-volt zener diode 125 in the emitter circuit of transistor 116, provides a return path for the collector of transistor 115. Diode 126 prevents the emitter-base junction between transistors 115 and 116 from being back-biased beyond the maximum rating of the transistors.

A feedback loop is connected from the output of the associated power amplifier module to the emitter of the first stage (115) via terminal 127. This input amplifier circuit has a virtually flat frequency response over the entire range of interest.

Figure 4:
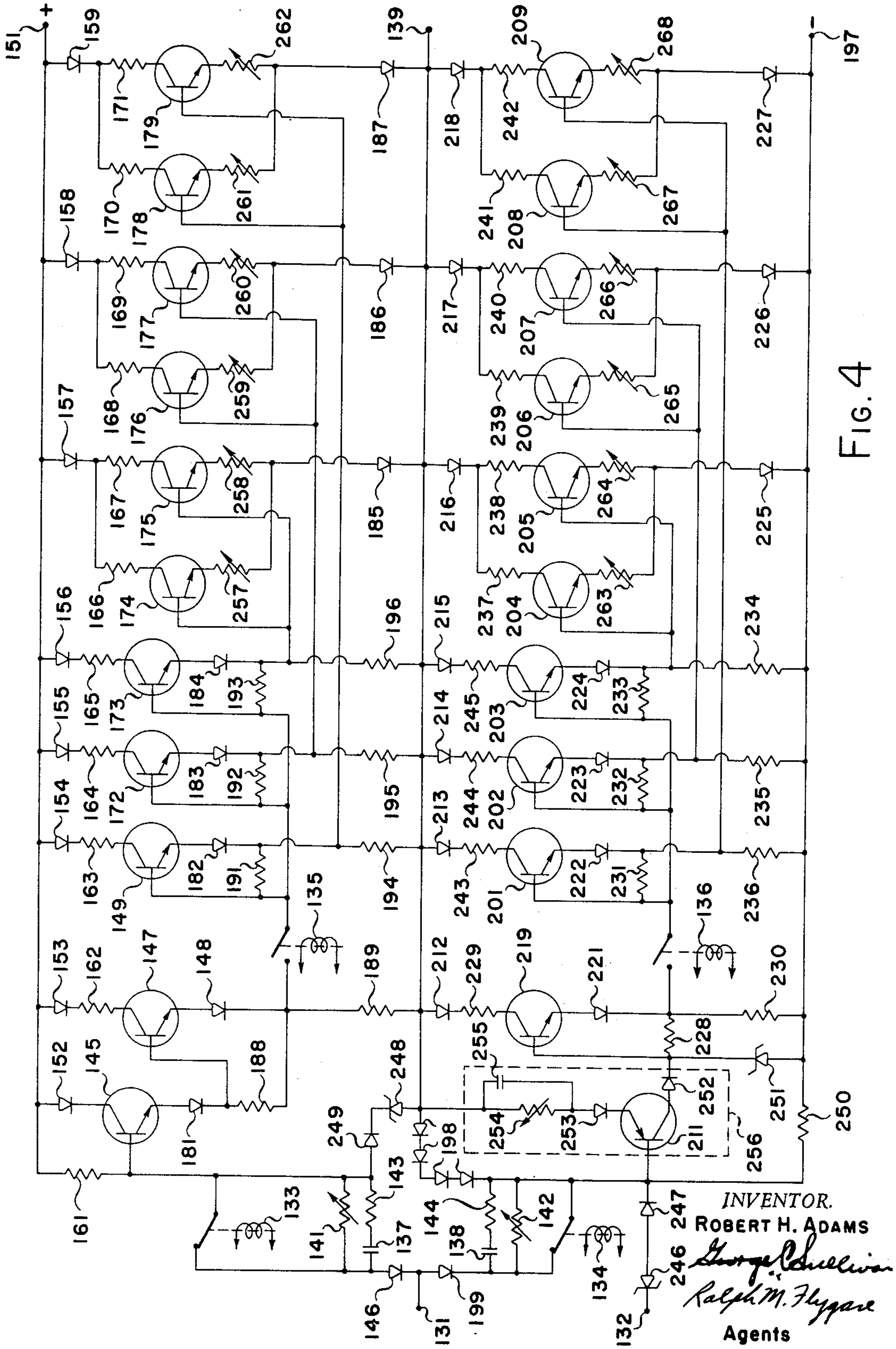
FIG. 4 is a schematic circuit diagram of a typical power amplifier module constructed in accordance with the invention.

A schematic circuit diagram of the power amplifier module of the invention, and typical of the several modules employed in the system, is shown in FIG. 4. These modules correspond to blocks 1–4 in FIG. 1 and 21–25 in FIG. 2. Each power amplifier module comprises a multiple-stage complementary-cascade amplifier connected to a negative power supply, and a series of cascaded emitter-followers connected to a positive power supply. As used in the overall system each module comprises a circuit which is the equivalent of one-half of a bridge. That is, a complete bridge amplifier consists of two power amplifier modules. In FIG. 1, modules 1 and 2 are connected in parallel to form one-half of the bridge amplifier, and modules 3 and 4 are paralleled to form the other half of the bridge amplifier. It should be understood, however, that the modules may be used in a single-ended arrangement, and that the bridge arrangement is but one option for using the power output stages of the invention. As indicated in an earlier part of this application, individual power amplifier modules may be connected in series or parallel with like modules to provide a specified total power output from the overall system, whether a bridge, push-pull, or single-ended output configuration is selected.

The input to the module shown in FIG. 4, obtained from terminal 117 of FIG. 3, is applied to terminal 131. The ground terminal 132 connects terminal 122 of FIG. 3.

The amplifier is constructed so as to ensure that power can be applied and the necessary operating bias voltages established without any adverse effect of transient turn-on currents. This is necessary because of the very large currents which would otherwise appear at the output in response to spurious transients which occur when power is first applied to the system.

The turn-on transient protection circuit comprises the four relays 133–136, and the two capacitors 137, 138. Relays 135 and 136 disconnect the input amplifier stages from the current-gain stages and relays 133–134 short respective ones of the bias resistors 141 and 142. By energizing these relays (133–136) a few seconds after the main power has been applied, any turn-on transients which may be generated in the input stages will not be amplified. After the relays have been energized the operating bias is permitted to slowly develop across capacitors 137 and 138 via respective ones of resistors 143 and 144.

The positive half of the input signal cycle appearing at terminal 131 is applied to the base of transistor 145 via overvoltage protection diode 146 and the closed contacts of relay 133. The input amplifier stage comprising transistor 145 has its output directly coupled to the predriver stage comprising transistor 147. The output from the emitter of pre-driver transistor 147 is supplied via diode 148 and the contacts on relay 135 to the base of the first transistor 149 in the three-transistor driver amplifier. Relay 135 applies an input to the driver after the turn-on delay ends. Relays 133–136 are all under the control of a time-delay relay in the power supply.

The positive D-C operating supply is connnected to terminal 151 which provides operating potentials to the various stages of the cascaded emitter-follower amplifier via respective ones of checking diodes 152–159. These checking diodes protect the transistors against a forward collector-base condition at turn off. A base bias network for the input transistor stages 145 and 211 comprises resistors 161, 141, 142 and 250. Resistors 162–171 appear in the collector leads of respective ones of transistors 147, and 149–179. Diodes 181, 148, and 182–187 are placed in series with the emitter leads of respective ones of transistors 145, 146 and 149–179 to prevent thermal runaway. In addition, the base lead of each of these transistors is returned to the common or ground terminal 132 of the power supplies, or to the emitter through a low-value resistance. This comprises respective ones of resistors 188–189 and 191–196. The output from the module is obtained from terminal 139.

The output amplifiers shown in FIG. 4 are representative of the circuit arrangement; in a practical construction the output amplifiers may consist of 15 transistors connected in parallel to handle the specified power.

The half of the amplifier module connected to the negative supply (197) has a complementary-cascade configuration with a local feedback loop connected from the collectors of the output transistors 201–209, to the emitter of input amplifier stage transistor 211. Diodes 212–218 are inserted in the collector leads of the transistors against a forward collector-base condition at turn off. Also, diodes 221–227 are inserted in the emitter leads of the transistors to prevent thermal runaway. The base lead of transistors 219 and 201–203 are returned to emitters thereof, through respective ones of low-value resistors 228 and 231–233. The base leads of transistors 204–209 are returned to the negative supply terminal 197 via respective ones of low-value resistors 234–236.

Input amplifier 256 has its output supplied to the base of pre-driver transistor 225. This stage, in turn, has its output supplied, via the contacts on relay 136, to the three-transistor driver amplifier comprising transistors 201–203. The output stages comprise transistors 204–209.

In order to reduce the demands on the heat sink of the output transistors, they are allowed to saturate under full lead conditions. By inserting 0.37 ohm resistors (237–242) in the collector leads of the output transistors 204–209, and 0.3 ohm resistors (243–245) in the collector leads of the driver transistors 201–203, and resistor 243 in the collector of predriver transistor 219, all of the transistors are permitted to saturate at full load.

It is necessary to ensure that transistors 201–209 do not at any time exceed their maximum ratings. This is accomplished in the complementary-cascade amplifier by the series-connected clamp diodes 198 which clamp the input transistor base (211) with respect to the output signal at terminal 139, thereby limiting current flow. Also, diode 199 limits overvoltage excursions of the input signal.

Zener diode 248 and diode 249 limit the base-to-output potential of the emitter-follower half of the amplifier thereby preventing excessive collector current through each output transistor (149 and 172–179) under any load condition.

Also, it is necessary that the input amplifier transistor 211 be prevented from saturating. This is accomplished by zener diode 246 and diode 247 connected in series between the base (211) and ground 132, and zener diode 251 connected from the collector, via diode 252, to the negative supply terminal 197. Thus, the collector voltage (211) is restrained from coming too close to the base voltage.

Diode 253, in the emitter circuit of transistor 211, performs a similar function to diode 221 in the emitter circuit of transistor 219. That is, diode 253 prevents thermal runaway by forcing the leakage current of the transistor (211), at cutoff, to go through the base instead of the emitter.

The network comprising resistor 254 and capacitor 255 is in the local feedback loop of the complementary-cascade amplifier, and is used to suppress parasitics.

Resistor 230 provides a return path for the collector of transistor 211 in the input amplifier 256 and the predriver stage (219) when relay 136 is open, thereby permitting the proper operation of the transistor 219 at cutoff and the avoidance of switching transients.

Adjustable resistors 257–262 in the emitter leads of respective ones of transistors 174–179, and adjustable resistors 263–268 in the emitter leads of respective ones of transistors 204–209 permit matching or compensation of the several output transistors so that they equally share the load currents.

As stated previously, the modules may be connected in either a parallel or series arrangement or a combination parallel-series arrangement to provide any desired output power and output impedance characteristics. Practical limitations on the number of power amplifier modules which may be combined is determined primarily by the capacity of the power supplies and the availability of an adequate cooling system.

While the invention has been shown and described with reference to an exemplary embodiment, it will be readily appreciated by those versed in the art that the inherent flexibility of the modular circuit design permits a considerable range of modifications to be made.

What is claimed is:

1. A modular solid-state power amplifier, comprising:

first and second transistor input stages having parallel-connected first and second input terminals for receiving a signal input;

a first transistor predriver amplifier direct-coupled to the output of said first input stage;

a source of positive operating potential;

a first driver amplifier, comprising a plurality of transistor stages each including a base, an emitter, and a collector, the bases thereof being connected in common to the output of said first predriver amplifier, the collectors thereof being connected to said source of positive operating potential;

a two-terminal load device;

a first output amplifier for amplifying the positive half-cycles of said signal input, comprising a plurality of cascaded emitter-follower transistor stages each including a base, an emitter, and a collector, the bases thereof being connected to the emitters of respective transistor stages of said first driver amplifier, the collectors thereof being connected to said source of positive operating potential, and the emitters thereof being connected to one terminal of said load device;

a source of negative operating potential;

a second transistor predriver amplifier direct-coupled to the output of said second input stage;

a second driver amplifier, comprising a plurality of transistor stages each including a base, an emitter, and a collector, the bases thereof being connected in common to the output of said second predriver amplifier, the collectors thereof being connected to said one terminal of said load device;

a second output amplifier for amplifying the negative half-cycles of said signal input, comprising a plurality of complementary-cascade transistor stages each including a base, an emitter, and a collector, the bases thereof being connected to the emitters of respective transistor stages of said second driver amplifier, the collectors thereof being connected to said one terminal of said load device, and the emitters thereof being connected to said source of negative operating potential; and means returning said sources of positive and negative operating potential to the other terminal of said load device.

2. An amplifier as defined in claim 1 including:

time-delay switching means connected to said first and second input stages and to said first and second driver amplifiers for selectively controlling the application of said signal input thereto, thereby suppressing turn-on transients from reaching said load device.

3. A modular solid-state power amplifier as defined in claim 1 including:

a plurality of protective diodes, one each being connected in series with the emitter of a corresponding transistor stage in said first and second driver amplifiers, and of said first and second output amplifiers, for preventing thermal run-away thereof.

4. A modular solid-state power amplifier as defined in claim 1 including:

a plurality of checking diode means being connected in series with the collectors of corresponding transistor stages of said first and second driver amplifiers, and of said first and second output amplifiers, for the suppression of turn-off transients.

5. A modular solid-state power amplifier as defined in claim 1 including:

diode clamp means connected between said second input terminal of said second transistor input stage and said one terminal of said load device for clamping the signal input to said second transistor input stage with respect to the output signal at said one terminal of said load device.

6. A direct-coupled bridge amplifier comprising:

first and second power amplifier modules, each comprising;

first and second transistor input stages having parallel-connected input terminals for receiving input signals;

a first transistor predriver amplifier direct-coupled to the output of said first input stage;

a source of positive operating potential;

a first driver amplifier, comprising a plurality of transistor stages each including a base, an emitter, and a collector, the bases thereof being connected in common to the output of said first predriver amplifier, the collectors thereof being connected to said source of positive operating potential;

a first output amplifier for amplifying the positive half-cycles of said input signals, comprising a plurality of cascaded emitter-follower transistor stages each including a base, an emitter, and a collector, the bases thereof being connected to the emitters of respective transistor stages of said first driver amplifier, the collectors thereof being connected to said source of positive operating potential, and the emitters thereof being connected to a common output terminal;

a source of negative operating potential;

a second transistor predriver amplifier direct-coupled to the output of said second input stage;

a second driver amplifier, comprising a plurality of transistor stages each including a base, an emitter, and a collector, the bases thereof being connected in common to the output of said second predriver amplifier, the collectors thereof being connected to said common output terminal;

a second output amplifier for amplifying the negative half-cycles of said input signals, comprising a plurality of complementary-cascade transistor stages each including a base, an emitter, and a collector, the bases thereof being connected to the emitters of respective transistor stages of said second driver amplifier, the collectors thereof being connected to said source of negative operating potential;

a load device connected between the common output terminals of said first and second power amplifier modules;

means for supplying a first push-pull input signal to the input terminals of said first and second transistor input stage of said first power amplifier module; and means for supplying a second push-pull input signal, which is 180 degrees out-of-phase with said first push-pull input signal, to the input terminals of said first and second transistor input stages of said second power amplifier module.

7. An amplifier as defined in claim 6 including:

time-delay switching means connected to said first and second input stages and to said first and second driver amplifiers for selectively controlling the application of said signal input thereto, thereby suppressing turn-on transients from reaching said load device.

8. An amplifier as defined in claim 6 including:

a plurality of protective diodes, one each of which is connected in series with the emitter of each transistor in the first and second driver amplifiers, and the first and second output amplifier, in each of said power amplifier modules, for preventing thermal run-away.

9. An amplifier as defined in claim 6 including:

a plurality of checking diode means being connected in series with the collectors of corresponding transistor stages of said first and second driver amplifiers, and of said first and second output amplifiers, of each of said power amplifier modules, for suppressing turn-off transients.

10. An amplifier as defined in claim 6 wherein each of said power amplifier modules includes:

diode clamp means connected between one of the terminals of said pair of input terminals of said second transistor input stage and said common output terminal, for clamping the input signals at said second transistor input stage with respect to the output signal at said common output terminal.

* * * * *